S. RYAN.
Land-Marker.
No. 8,935. Reissued Oct. 14, 1879.
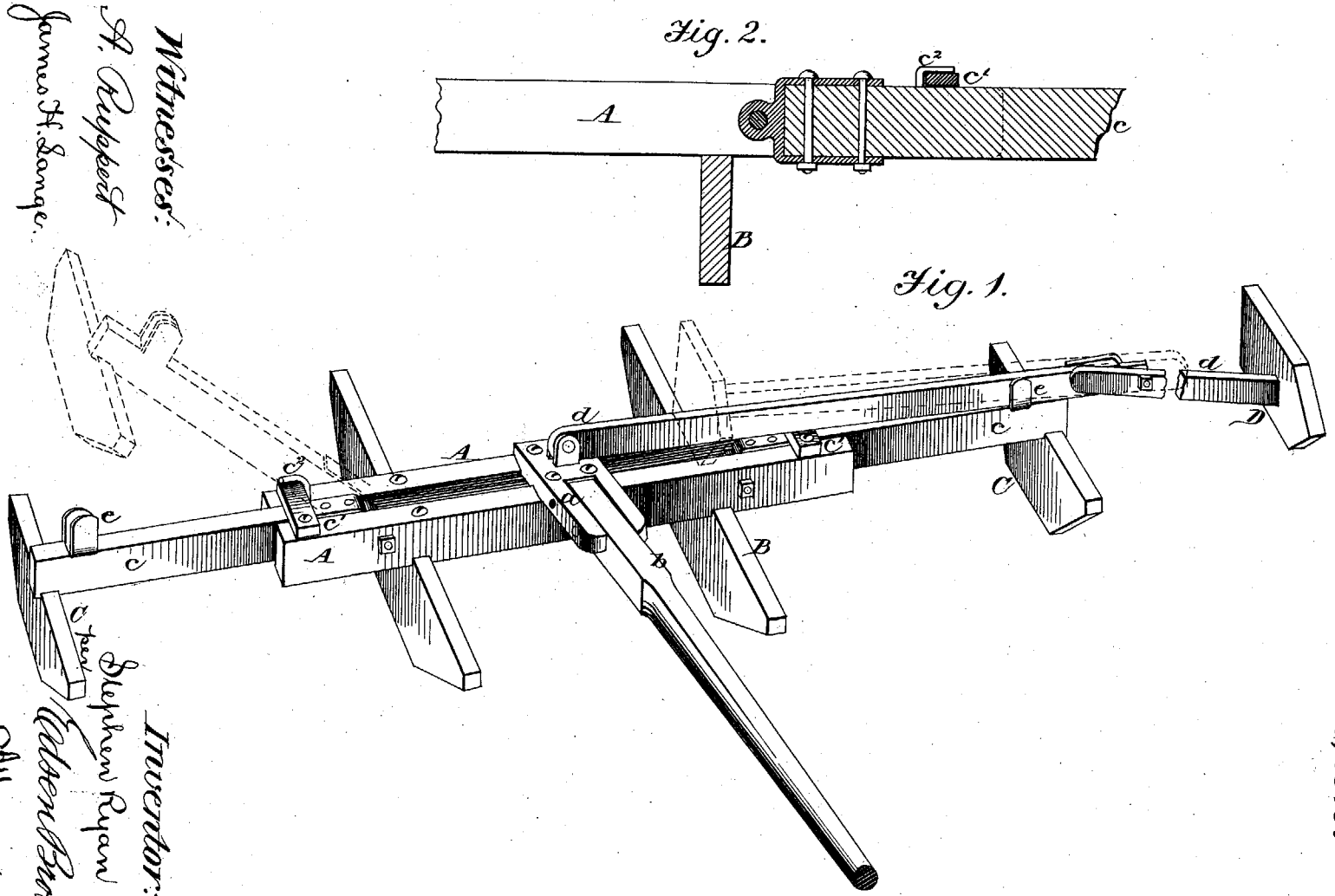
N. PETERS, PHOTO-LITHOGRAPHER, WASHINGTON, D. C.

UNITED STATES PATENT OFFICE.

STEPHEN RYAN, OF PECATONICA, ILLINOIS.

IMPROVEMENT IN LAND-MARKERS.

Specification forming part of Letters Patent No. 217,242, dated July 8, 1879; Reissue No. 8,935, dated October 14, 1879; application filed August 25, 1879.

*To all whom it may concern:*

Be it known that I, STEPHEN RYAN, of Pecatonica, in the county of Winnebago and State of Illinois, have invented certain new and useful Improvements in Land-Markers; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1 is a perspective view of my improved ground-marker, used preliminary to planting corn, with one section of one of the markers and a second one shown elevated in dotted lines; and Fig. 2 is a cross-section of the same.

In the two figures corresponding parts are denoted by like letters.

This invention relates to certain improvements in land-markers for preparing the ground for planting corn; and it consists in the employment of means for enabling the side-hinged markers to more effectually resist pressure that would impede their passage through the ground, and for holding them either in contact with the ground or in any elevated position, substantially as hereinafter more fully set forth.

In the accompanying drawings, A refers to parallel bars, which may be duplicated, if desired, to form a suitable support for the mounting thereon of a seat for the driver or attendant, these bars being secured to runners or markers B, arranged transversely to said bars.

Hounds *a*, disposed in an upwardly-inclined position, are secured to these bars about midway between the markers B, and between these hounds is articulated the tongue *b*, which may be held in the same inclined position with the hounds by a pin inserted through additional perforations in the hounds and tongue.

C C are two other markers, adapted to mark the ground upon each side of and suitable distances from the markers B, to increase the marking capacity of the machine. These markers are fastened to bars or levers *c*, with their inner ends hinged or pivoted between the outer ends of the bars A, so as to permit of their being raised or lowered, or to rise and fall with the markers when not buttoned down, as presently set forth, to accommodate the unevenness of the ground without endangering the breaking of the same. If it is desired, however, to hold the markers C down in forcible contact with the ground, provision is made for that purpose by the employment of buttons $c^1$, swiveled upon one of the parallel bars A, and adapted to be passed under catches or hooks $c^2$, fastened to the upper side of the other bar, as clearly shown in Fig. 1.

D is another marker, with its lever or securing-bar *d* made into two parts, hinged together in suitable lengths, one of which is hinged or pivoted to the hounds, or to a point about midway of the machine. This marker serves as a guide-marker, and in turning the machine it can be folded back upon either of the side or wing markers, as shown, one section of its lever or bar resting in either of two sockets or clips, *e e*, fastened to the said side markers.

It will be further observed that by lifting the side or wing markers and passing the buttons under the same, they may be held in an elevated position and up out of the way when not needed.

Having thus fully described my invention, I claim and desire to secure by Letters Patent—

1. The frame consisting of the parallel beams or bars A, having the markers B, and carrying the buttons $c^1$ and catches $c^2$, to the projecting ends of which are secured the hinged markers, all combined substantially as shown and described.

2. A land-marker consisting of the markers C *c*, hinges between the projecting ends of the beams A and markers D *d*, attached to the hounds *a*, the markers C *c* carrying the clips *e*, and the beams A having markers B, buttons and catches $c^1$ $c^2$, and hounds *a*, substantially as shown and described.

In testimony that I claim the foregoing I I have hereunto set my hand this 7th day of August, 1879.

STEPHEN RYAN.

Witnesses:
A. S. VAN DYKE,
GEO. GORHAM.